US009435372B2

(12) United States Patent
Murata et al.

(10) Patent No.: US 9,435,372 B2
(45) Date of Patent: Sep. 6, 2016

(54) TAPERED ROLLER BEARING AND POWER TRANSMISSION DEVICE

(71) Applicant: JTEKT CORPORATION, Osaka-shi, Osaka (JP)

(72) Inventors: Junji Murata, Kashiba (JP); Shigeo Kamamoto, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 2 days.

(21) Appl. No.: 14/586,459

(22) Filed: Dec. 30, 2014

(65) Prior Publication Data

US 2015/0198202 A1 Jul. 16, 2015

(30) Foreign Application Priority Data

Jan. 16, 2014 (JP) .................................. 2014-005738

(51) Int. Cl.
*F16C 33/58* (2006.01)
*F16C 19/36* (2006.01)
*F16C 33/36* (2006.01)
*F16C 33/66* (2006.01)
*F16C 19/22* (2006.01)
*F16C 19/54* (2006.01)
*F16C 33/46* (2006.01)

(52) U.S. Cl.
CPC ........... *F16C 19/364* (2013.01); *F16C 33/366* (2013.01); *F16C 33/585* (2013.01); *F16C 19/225* (2013.01); *F16C 19/548* (2013.01); *F16C 33/467* (2013.01); *F16C 33/4635* (2013.01); *F16C 33/6674* (2013.01); *F16C 2240/70* (2013.01); *F16C 2361/61* (2013.01)

(58) Field of Classification Search
CPC .. F16C 19/225; F16C 19/364; F16C 19/548; F16C 33/366; F16C 33/4635; F16C 33/467; F16C 33/583; F16C 33/585; F16C 33/6674; F16C 2019/367; F16C 2240/70; F16C 2361/61
See application file for complete search history.

(56) References Cited

U.S. PATENT DOCUMENTS

| 1,736,037 | A | * | 11/1929 | Else | ...................... | F16C 19/364 384/565 |
| 6,623,168 | B2 | * | 9/2003 | Matsuyama | .......... | F16C 19/225 384/450 |
| 8,899,839 | B2 | * | 12/2014 | Liang | .................... | F16C 19/225 384/564 |
| 2015/0093063 | A1 | * | 4/2015 | Liang | .................... | F16C 19/225 384/564 |

FOREIGN PATENT DOCUMENTS

JP       H05-75520 U       10/1993

* cited by examiner

*Primary Examiner* — James Pilkington
(74) *Attorney, Agent, or Firm* — Oliff PLC (57) ABSTRACT

A curvature radius of a large rib end face of an inner ring is set to a value larger than a distance R, and a curvature radius of a large end face of a tapered roller is set to a range of 80 to 100% relative to the distance R, where R represents a distance from a cone center of the tapered roller to a predetermined reference point that is separated from the cone center along an inner ring raceway surface. A center of a contact ellipse that is formed by contact between the large end face of the tapered roller and the large rib end face of the inner ring is located on an imaginary straight line passing through a center of curvature of the large end face of the tapered roller and a center of curvature of the large rib end face of the inner ring.

4 Claims, 10 Drawing Sheets

TAPERED ROLLER BEARING AND POWER TRANSMISSION DEVICE

INCORPORATION BY REFERENCE

The disclosure of Japanese Patent Application No. 2014-005738 filed on Jan. 16, 2014 including the specification, drawings and abstract, is incorporated herein by reference in its entirety.

BACKGROUND OF THE INVENTION

1. Field of the Invention

The invention relates to tapered roller bearings and power transmission devices.

2. Description of the Related Art

Figure 10:
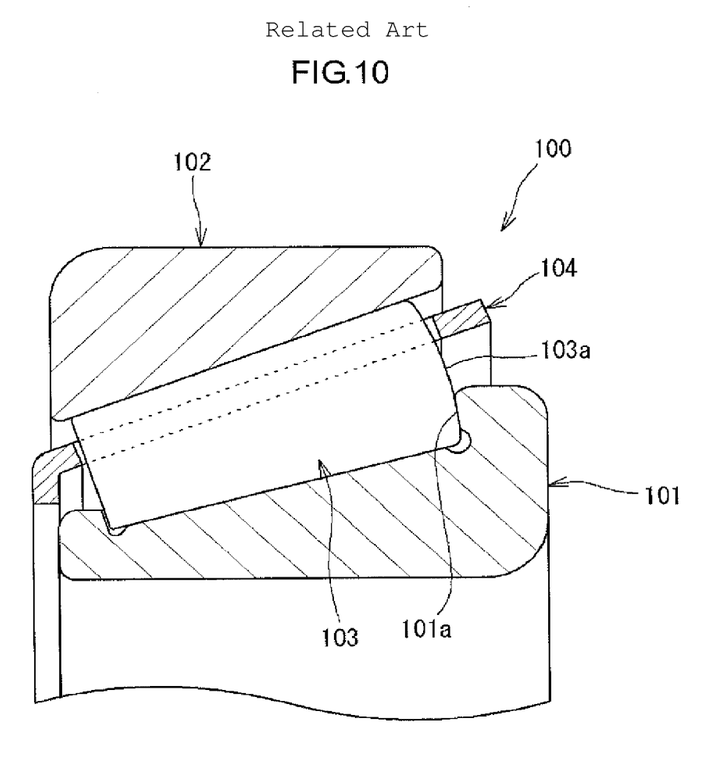
FIG. 10 is an axial section of a conventional tapered roller bearing.

Tapered roller bearings are characterized by larger loading capacity and higher rigidity compared to other rolling bearings of the same size. The tapered roller bearings are therefore used for drive transmission devices such as differential gear units and transaxle units in automobiles that require such characteristics. FIG. 10 is an axial section of a conventional tapered roller bearing. As shown in FIG. 10, a tapered roller bearing 100 includes an inner ring 101, an outer ring 102, a plurality of tapered rollers 103, and an annular cage 104. The tapered rollers 103 are interposed between the inner and outer rings 101, 102 in a rollable manner. The cage 104 holds the tapered rollers 103 at regular intervals in the circumferential direction. A large end face 103a of each tapered roller 103 is formed as a convex surface and a cone back face rib (hereinafter referred to as a large rib) end face 101a of the inner ring 101 is formed as a concave surface, and thus sliding friction between the end faces 103a, 101a is reduced (see, e.g., Japanese Utility Model Application Publication No. H05-75520 (JP H05-75520 U))

In this tapered roller bearing, no clear guidelines are given regarding specific values of the respective curvature radii of the large end face 103a of the tapered roller 103 and the large rib end face 101a of the inner ring 101. Therefore, the large end face 103a of each tapered roller 103 may contact an edge of the large rib end face 101a of the inner ring 101 in the radial direction depending on the curvature radii of the end faces 103a, 101a, causing an edge load.

SUMMARY OF THE INVENTION

It is one object of the invention to provide a tapered roller bearing and a power transmission device which can effectively reduce an edge load that is generated between a large end face of a tapered roller and a large rib end face of an inner ring.

A tapered roller bearing according to an aspect of the invention includes: an inner ring having an inner ring raceway surface and a large rib that adjoins one side of the inner ring raceway surface in an axial direction; an outer ring that is disposed concentrically with the inner ring in an outer periphery of the inner ring and that has an outer ring raceway surface facing the inner ring raceway surface; a plurality of tapered rollers that are interposed between the inner ring raceway surface and the outer ring raceway surface in a rollable manner; and a cage that holds the tapered rollers at predetermined intervals in a circumferential direction. In the tapered roller bearing, a large end face of each of the tapered rollers is formed as a convex surface, and a large rib end face of the inner ring which is slide-contacted by the large end face of the tapered roller is formed as a concave surface, a curvature radius $R_i$ of the large rib end face is set to a value larger than a distance R, and a curvature radius $R_r$ of the large end face of the tapered roller is set to a range of 80 to 100% relative to the distance R, where R represents a distance from a cone center of the tapered roller to a predetermined reference point that is separated from the cone center along the inner ring raceway surface, and a center of a contact ellipse that is formed by contact between the large end face of the tapered roller and the large rib end face is located on an imaginary straight line passing through a center of curvature of the large end face of the tapered roller and a center of curvature of the large rib end face. As used herein, the expression "along the inner ring raceway surface" includes not only the case where the point is actually located along the inner ring raceway surface, but also the case where the point is located along an extended line of the inner ring raceway surface.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
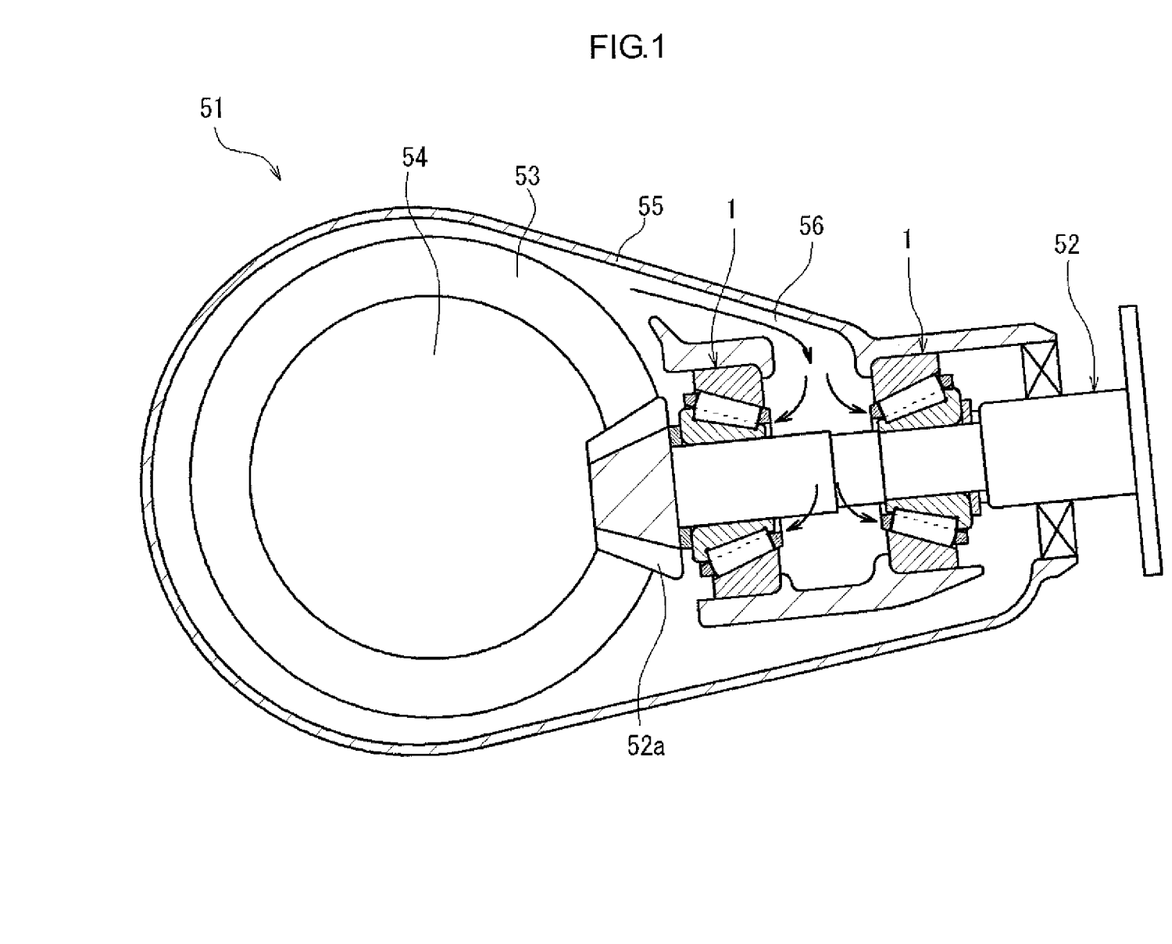
FIG. 1 is a sectional view of a differential unit to which a tapered roller bearing according to an embodiment of the invention is applied.

A preferred embodiment of the invention will be described below with reference to the accompanying drawings. FIG. 1 is a sectional view of a differential unit as a drive transmission device to which a tapered roller bearing according to an embodiment of the invention is applied. A differential unit 51 is placed on a power transmission path through which output of an engine of an automobile is transmitted. The differential unit 51 transmits the output of the engine to rear wheels as driving wheels placed on both sides in the lateral direction (the direction perpendicular to the plane of FIG. 1) of the differential unit 51

The differential unit 51 includes a pinion shaft (power transmission shaft) 52, a ring gear 53, a differential mechanism 54, and a housing 55. The pinion shaft 52 is connected to a propeller shaft (not shown) so as to be rotatable together with the propeller shaft. The propeller shaft is a shaft that transmits the output of the engine. The ring gear 53 meshes with a pinion gear 52a provided at one axial end (distal end) of the pinion shaft 52. The differential mechanism 54 is coupled to the ring gear 53 so as to be rotatable together with the ring gear 53, and rotates the rear wheels. The housing 55 accommodates the pinion shaft 52, the ring gear 53, and the differential mechanism 54. The pinion shaft 52 is supported by a pair of tapered roller bearings 1 so as to be rotatable with respect to the housing 55. A lubricating oil supply passage 56 is formed in the housing 55 in order to introduce lubricating oil to lubricate the raceway surfaces of the pair of tapered roller bearings 1 as shown by arrows in the figure.

Figure 2:
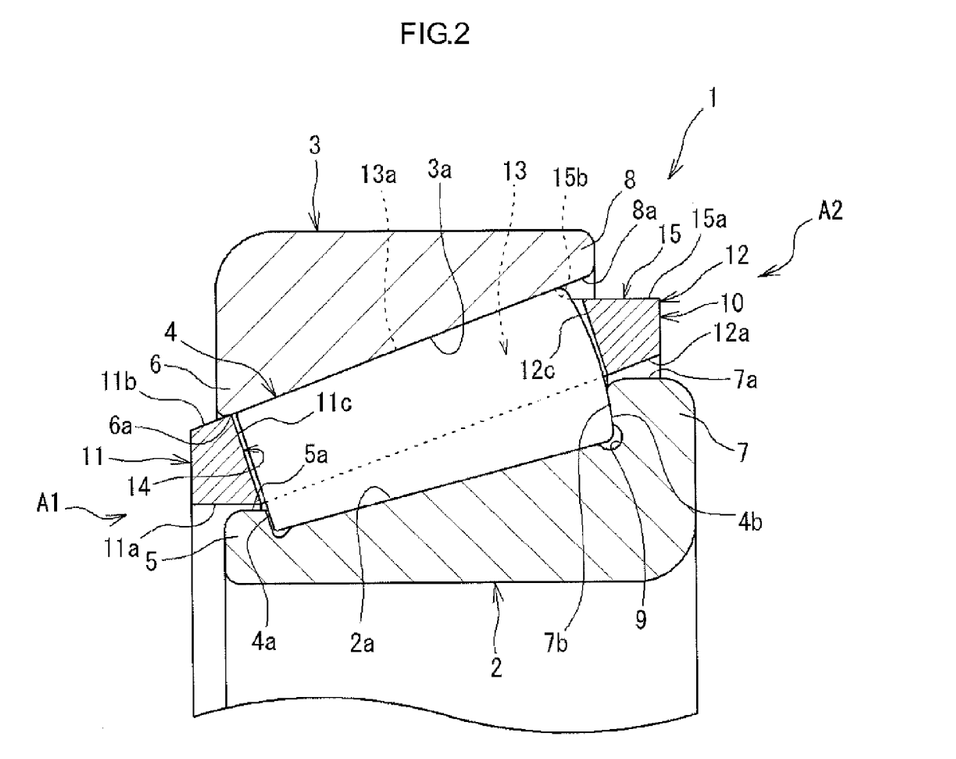
FIG. 2 is an axial section of the tapered roller bearing.

FIG. 2 is an axial section of the tapered roller bearing 1. The tapered roller bearing 1 includes an inner ring 2, an outer ring 3, a plurality of tapered rollers 4, and a cage 10. The outer ring 3 is disposed concentrically with the inner ring 2 in an outer periphery of the inner ring. The tapered rollers 4 are arranged between the inner and outer rings 2, 3. The cage 10 holds the tapered rollers 4 at predetermined intervals in the circumferential direction. The inner ring 2 is an annular member formed of bearing steel, steel for machine structural use, etc. An inner ring raceway surface 2a as a conical surface is formed on the outer periphery of the inner ring 2 so that the tapered rollers 4 can roll thereon. Like the inner ring 2, the outer ring 3 is also an annular member formed of bearing steel, steel for machine structural use, etc. An outer ring raceway surface 3a as a conical surface is formed on the inner periphery of the outer ring 3 so that the tapered rollers 4 can roll thereon. The outer ring raceway surface 3a faces the inner ring raceway surface 2a. The tapered rollers 4 are members formed of bearing steel etc., and are interposed between the inner ring raceway surface 2a and the outer ring raceway surface 3a in a rollable manner.

A cone front face rib (hereinafter referred to as a small rib) 5 and a large rib 7 are formed on the outer periphery of the inner ring 2 so as to protrude outward in the radial direction. The small rib 5 adjoins one end of the inner ring raceway surface 2a in the axial direction, and the large rib 7 adjoins the other end of the inner ring raceway surface 2a in the axial direction. A large rib end face 7b of the large rib 7, which is an end face on the side of the inner ring raceway surface 2a, is formed as a concave surface. A grinding undercut portion (hereinafter referred to as a recessed portion) 9 having a concave shape in section is formed in a corner portion of the inner ring 2 along the entire circumference, namely a portion between the inner ring raceway surface 2a and the large rib end face 7b. A large end face 4b of each tapered roller 4 is formed as a convex surface so as to slide-contact the large rib end face 7b.

Figure 3:
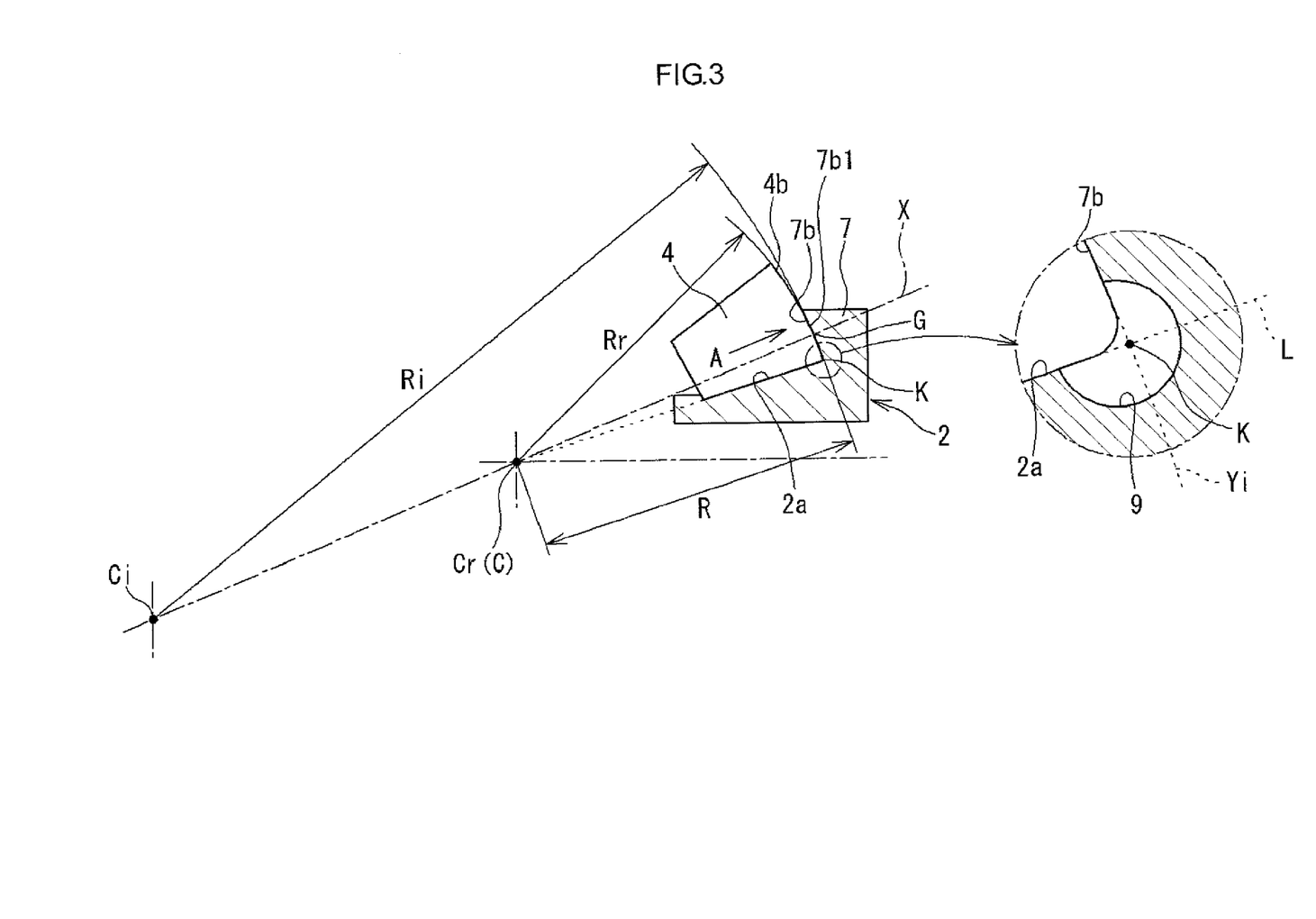
FIG. 3 is a diagram illustrating the shape of a large rib end face of an inner ring and the shape of a large end face of each tapered roller in the tapered roller bearing.

FIG. 3 is a diagram illustrating the shape of the large rib end face 7b of the inner ring 2 and the shape of the large end face 4b of each tapered roller 4. As shown in FIG. 3, the shape of the large rib end face 7b of the inner ring 2 and the shape of the large end face 4b of each tapered roller 4 are designed based on a distance R. The distance R is the distance from a cone center C of the tapered roller 4 to a predetermined reference point K that is separated from the cone center C along the inner ring raceway surface 2a. As used herein, the term "cone center" of the tapered roller 4 means the vertex of the conical shape of the tapered roller 4. The expression "along the inner ring raceway surface 2a" includes not only the case where the point is actually located along the inner ring raceway surface 2a, but also the case where the point is located along an extended line L of the inner ring raceway surface 2a. In the present embodiment, the reference point K is a point on the extended line L of the inner ring raceway surface 2a. The term "distance R" refers to the distance between two points, namely the distance between the cone center C and the reference point K. For example, the distance R is a distance that satisfies the equation "$R^2=x^2+y^2$" in the case where the coordinates of the cone center C are (0, 0) and the coordinates of the reference point K are (x, y) in x-y coordinates.

The large rib end face 7b of the inner ring 2 is formed at such a position that the large rib end face 7b passes through the reference point K. As used herein, the expression "the large rib end face 7b 'passes through the reference point K'" includes not only the case where the large rib end face 7b actually passes through the reference point K, but also the case where an extended line Yi of the large rib end face 7b passes through the reference point K. Accordingly, the "reference point K" is the point where the inner ring raceway surface 2a or its extended line L intersects the large rib end face 7b or its extended line Yi. In the present embodiment, the extended line Yi of the large rib end face 7b passes through the reference point K.

The curvature radius Ri of the large rib end face 7b of the inner ring 2 is set to a value larger than the distance R. More preferably, the curvature radius Ri of the large rib end face 7b is set so as to satisfy the relation "100%<Ri≤300%" relative to the distance R. The curvature radius Rr of the large end face 4b of the tapered roller 4 is set to the range of 80 to 100% relative to the distance R, and is set so as to be smaller than the curvature radius Ri of the large rib end face 7b. In the present embodiment, the center of curvature Cr of the large end face 4b of the tapered roller 4 matches the cone center C.

The center G of a contact ellipse (a cross-hatched portion in FIG. 4) that is formed by contact between the large end face 4b of the tapered roller 4 and the large rib end face 7b is located on an imaginary straight line X passing through the center of curvature Cr of the large end face 4b of the tapered roller 4 and the center of curvature Ci of the large rib end face 7b. The center G of the contact ellipse is thus located near the center of the large rib end face 7b in the radial direction of the inner ring 2, as shown in FIG. 3.

Figure 4:
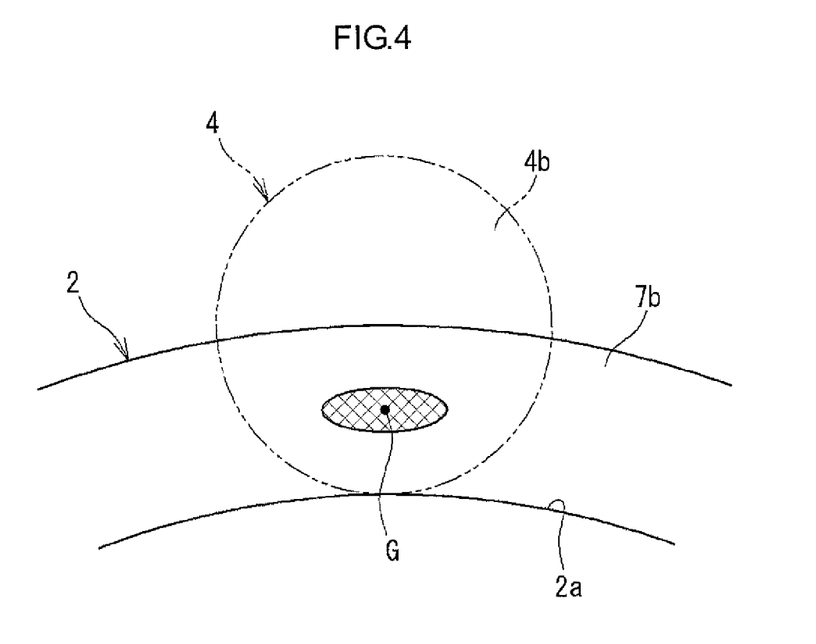
FIG. 4 is a diagram of the large rib end face of the inner ring of FIG. 3 as viewed from the direction A.

With the above configuration, the center G of the contact ellipse that is formed by contact between the large end face 4b of the tapered roller 4 and the large rib end face 7b is located on the imaginary straight line X passing through the center of curvature Cr of the large end face 4b of the tapered roller 4 and the center of curvature Ci of the large rib end face 7b of the inner ring 2. The center G of the contact ellipse can thus be located near the center of the large rib end face 7b in the radial direction of the inner ring 2. This can suppress contact of the large end face 4b of the tapered roller 4 with an edge of the large rib end face 7b in the radial direction of the inner ring 2, and as a result, can effectively reduce an edge load that is generated between the large end face 4b of the tapered roller 4 and the large rib end face of the inner ring 2.

Setting the distance R and the curvature radii Ri, Rr to the above numerical ranges can reduce the radial width of the contact ellipse. That is, the radial upper and lower ends of the contact ellipse can be located farther away from the edge of the large rib end face 7b. The contact ellipse is thus less likely to contact the edge of the large rib end face 7b, which can effectively reduce the edge load.

Figure 5:
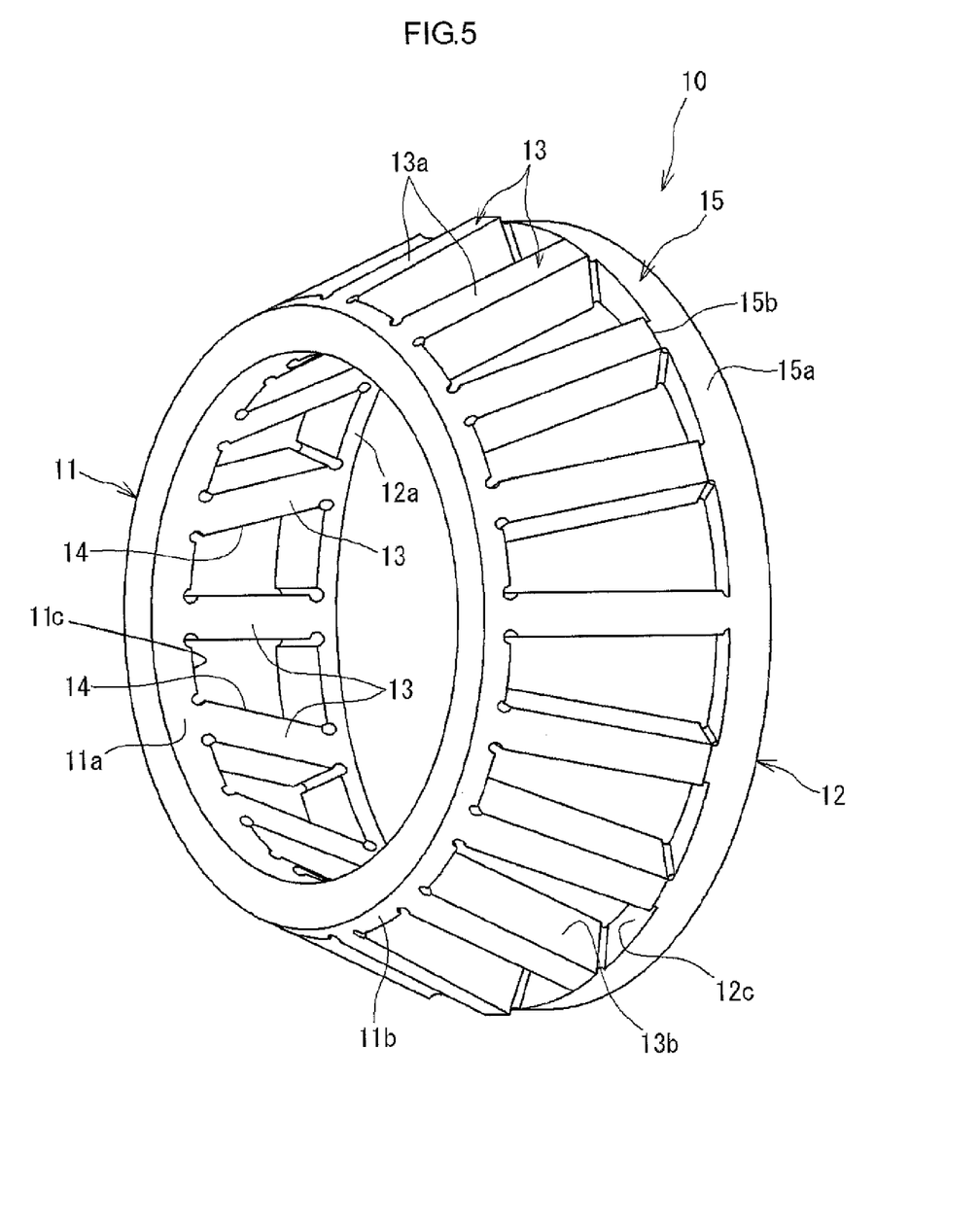
FIG. 5 is a perspective view of a cage of the tapered roller bearing.

FIG. 5 is a perspective view of the cage 10. Referring to FIGS. 5 and 2, the cage 10 is a member made of a synthetic resin and formed by injection molding etc. The cage 10 includes a pair of annular portions 11, 12 (a small diameter annular portion 11 and a large diameter annular portion 12)

and a plurality of bars 13. The annular portions 11, 12 are separated from each other at a predetermined interval and face each other. The bars 13 are disposed at predetermined intervals in the circumferential direction so as to extend between the annular portions 11, 12. The annular portions 11, 12 and two adjacent ones of the bars 13 define a pocket 14 that accommodates and holds the tapered roller 4.

The cage 10 is disposed in an annular space between the inner ring 2 and the outer ring 3. The cage 10 accommodates the tapered rollers 4 in the pockets 14, respectively, so that the tapered rollers 4 are arranged at substantially regular intervals in the circumferential direction.

Annular side surfaces 11c, 12c of the annular portions 11, 12, which face the pockets 14, slide-contact the end faces 4a, 4b of the tapered rollers 4, whereby axial movement of the cage 10 is restricted. That is, the cage 10 is positioned in the axial direction as the annular portions 11, 12 slide-contact the end faces 4a, 4b of the tapered rollers 4. The annular side surfaces 11c, 12c of the annular portions 11, 12 thus form a first slide-contact surface that slide-contacts the end faces 4a, 4b of the tapered rollers 4 to position the cage 10 in the axial direction by the end faces 4a, 4b of the tapered rollers 4.

As shown in FIG. 5, a radial outer surface 13a of each bar 13 of the cage 10 is formed as a conical surface that conforms to the outer ring raceway surface 3a. As the inner ring 2 and the outer ring 3 rotate relative to each other, the cage 10 rotates in the circumferential direction with the outer surfaces 13a of the bars 13 slide-contacting the outer ring raceway surface 3a. That is, the cage 10 of the present embodiment slide-contacts the outer ring raceway surface 3a, and is thus positioned in the radial direction by the outer ring raceway surface 3a. The outer surfaces 13a of the bars 13 of the present embodiment thus form a second slide-contact surface that slide-contacts the outer ring raceway surface 3a to position the cage 10 in the radial direction by the outer ring raceway surface 3a.

The small diameter annular portion 11 is an annular portion having a relatively large thickness, and is disposed between the small rib 5 of the inner ring 2 and one end 6 of the outer ring 3 in the axial direction. The small diameter annular portion 11 closes a one end-side annular opening A1 that is formed by the small rib 5 and the one end 6 of the outer ring 3 in the axial direction.

An inner peripheral surface 11a of the small diameter annular portion 11 has a substantially cylindrical shape, and a small clearance is provided between the inner peripheral surface 11a of the small diameter annular portion 11 and an outer peripheral surface 5a of the small rib 5. An outer peripheral surface 11b of the small diameter annular portion 11 is formed as a tapered surface extending along the outer surfaces 13a of the bars 13, and a small clearance is provided between the outer peripheral surface 11b of the small diameter annular portion 11 and an inner peripheral surface 6a of the one end 6 of the outer ring 3 in the axial direction. The small diameter annular portion 11 thus closes the one end-side annular opening A1 with the small clearances between the small diameter annular portion 11 and the small rib 5 and between the small diameter annular portion 11 and the one end 6 of the outer ring 3 in the axial direction.

These small clearances thus provided at one end of the tapered roller bearing 1 in the axial direction as the one end-side annular opening A1 is closed by the small diameter annular portion 11 serve as inlet ports for the lubricating oil that flows into the tapered roller bearing 1 to lubricate it. That is, as the inner and outer rings 2, 3 rotate relative to each other, the tapered roller bearing 1 performs a pumping action to cause the lubricating oil in the bearing to flow from the small diameter side toward the large diameter side of the raceway surfaces 2a, 3a by a centrifugal force generated by the relative rotation.

The lubricating oil flows into the tapered roller bearing 1 through the one end-side annular opening A1 by the pumping action. The small clearances at the one end of the tapered roller bearing 1 in the axial direction thus serve as the inlet ports for the lubricating oil that flows into the tapered roller bearing 1 to lubricate it.

If an excessive amount of lubricating oil enters the tapered roller bearing 1, running torque of the tapered roller bearing 1 may be increased by oil agitation resistance or viscosity resistance of the lubricating oil. In the present embodiment, however, the small diameter annular portion 11 closes the one end-side annular opening A1 with the small clearances between the small diameter annular portion 11 and the small rib 5 and between the small diameter annular portion 11 and the one end 6 of the outer ring 3 in the axial direction. This can limit excessive entry of the lubricating oil into the tapered roller bearing 1 through the one end-side annular opening A1, and as a result, can suppress an increase in oil agitation resistance due to an excessive amount of lubricating oil in the bearing, etc. The running torque of the tapered roller bearing 1 can thus be reduced.

Like the small diameter annular portion 11, the large diameter annular portion 12 is also an annular portion having a relatively large thickness, and is disposed between the large rib 7 of the inner ring 2 and the other end 8 of the outer ring 3 in the axial direction. The large diameter annular portion 12 closes the other end-side annular opening A2 that is formed by the large rib 7 and the other end 8 of the outer ring 3 in the axial direction.

Figure 6:
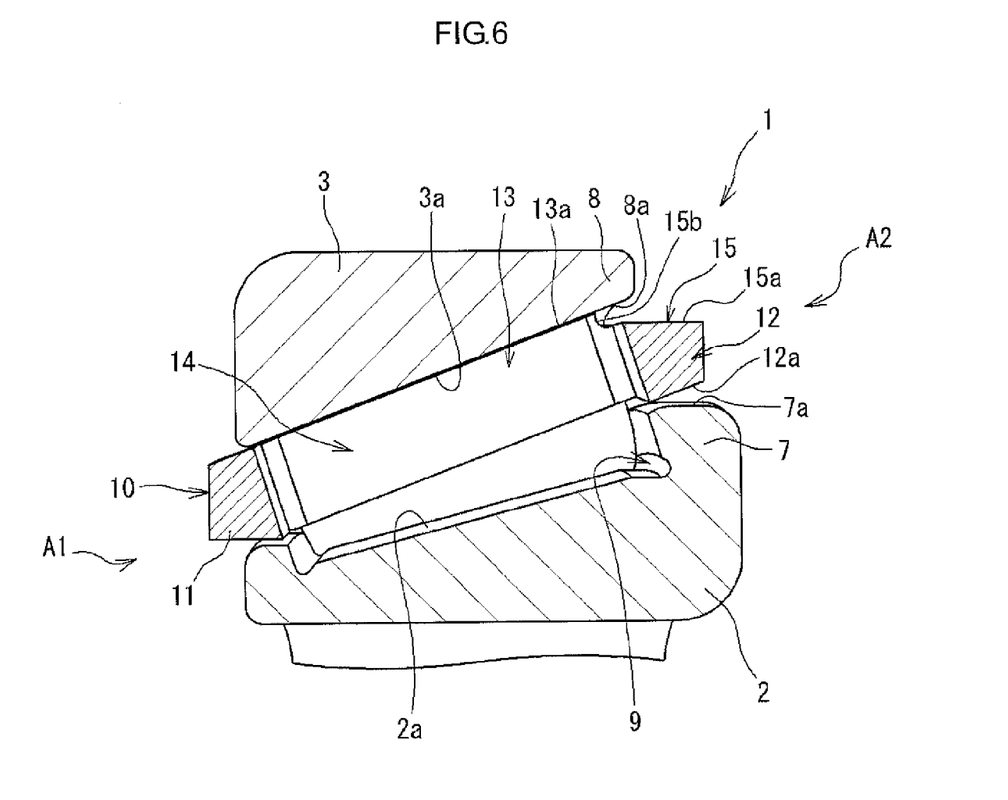
FIG. 6 is a sectional view of the tapered roller bearing, in which no tapered roller is shown in order to illustrate the form of a notch.

A notch 15 is formed in the outer periphery of the large diameter annular portion 12 by cutting the outer peripheral end of the large diameter annular portion 12 along the entire circumference. FIG. 6 is a sectional view of the tapered roller bearing 1, in which no tapered roller is shown in order to illustrate the form of the notch 15. Referring to FIGS. 6 and 5, the notch 15 is formed so as to extend radially inward from the outer edge of the large diameter annular portion 12 in the axial direction to the outer peripheral ends of the bars 13 beyond the outer peripheral edges of the pockets 14. The notch 15 is formed by a cylindrical surface 15a having a substantially cylindrical shape and stepped surfaces 15b. The stepped surfaces 15b extend continuously from the cylindrical surface 15a to the edges of the outer surfaces 13a of the bars 13.

As shown in FIG. 6, the notch 15 is formed by cutting radially inward the outer peripheral edge of the other end of each pocket 14 in the axial direction. If the notch 15 is not formed, the outer peripheral edge of the other end of each pocket 14 in the axial direction is closed to the outside of the tapered roller bearing 1 by the large diameter annular portion 12 and the outer ring raceway surface 3a. In the present embodiment, however, since the notch 15 is formed by cutting radially inward the outer peripheral edge of the other end each pocket 14 in the axial direction, the other end of each pocket 14 in the axial direction is open to the outside of the tapered roller bearing 1. The lubricating oil flowing along the outer ring raceway surface 3a into the pockets 14 is therefore quickly discharged from the tapered roller bearing 1 through the notch 15.

A clearance is provided between the cylindrical surface 15a of the notch 15 and an inner peripheral surface 8a of the other end 8 of the outer ring 3 in the axial direction. An inner peripheral surface 12a of the large diameter annular portion 12 is formed as a tapered surface extending along inner peripheral surfaces of the bars 13, and a small clearance is provided between the inner peripheral surface 12a of the large diameter annular portion 12 and an outer peripheral surface 7a of the large rib 7. The large diameter annular portion 12 thus closes the other end-side annular opening A2 with the clearance between the cylindrical surface 15a of the notch 15 and the inner peripheral surface 8a of the other end 8 of the outer ring 3 in the axial direction and with the small clearance between the large diameter annular portion 12 and the large rib 7.

The clearance and the small clearance thus provided at the other end of the tapered roller bearing 1 in the axial direction as the other end-side annular opening A2 is closed by the large diameter annular portion 12 serve as discharge ports for the lubricating oil that has flown into the tapered roller bearing 1 by the pumping action. That is, the lubricating oil that has flown into the tapered roller bearing 1 by the pumping action is used for lubrication in the tapered roller bearing 1, and is discharged from the other end-side annular opening A2. The small clearance and the small clearance at the other end of the tapered roller bearing 1 in the axial direction thus serve as the discharge ports for the lubricating oil that has flown into the tapered roller bearing 1 by the pumping action.

In the present embodiment, the large diameter annular portion 12 closes the other end-side annular opening A2 with the clearance between the cylindrical surface 15a of the notch 15 and the inner peripheral surface 8a of the other end 8 of the outer ring in the axial direction and with the small clearance between the large diameter annular portion 12 and the large rib 7. This can limit excessive discharge of the lubricating oil from the tapered roller bearing 1 through the other end-side annular opening A2.

In particular, since the large rib 7 limits discharge of the lubricating oil, the lubricating oil can be held near the recessed portion 9 (see FIG. 6) of the inner ring 2, namely near a portion near the contact portion between the large rib end face 7b and the large end face 4b of each tapered roller 4 which slide on each other. This can reduce sliding friction between the large rib end face 7b of the inner ring 2 and the large end face 4b of each tapered roller 4 and can suppress seizure therebetween etc.

The lubricating oil needs to be held in the inner ring 2 having the large rib 7, whereas an increase in oil agitation resistance, viscosity resistance, etc. by the lubricating oil need to be suppressed in the outer ring 3. In this respect, in the present embodiment, the notch 15 that discharges the lubricating oil from the tapered roller bearing 1 is formed in the outer periphery of the large diameter annular portion 12 by cutting radially inward the outer peripheral edge of each pocket 14. The lubricating oil that is going to flow out of the tapered roller bearing 1 along the outer ring raceway surface 3a can thus be quickly discharged from the tapered roller bearing 1 through the notch 15.

The lubricating oil can thus be appropriately held in the inner ring 2 of the tapered roller bearing 1, while an increase in oil agitation resistance etc. due to an excessive amount of lubricating oil can be suppressed in the outer ring 3 of the tapered roller bearing 1. This can suppress seizure etc. between the large rib 7 and each tapered roller 4, and can also reduce running torque of the tapered roller bearing 1.

Figure 7:
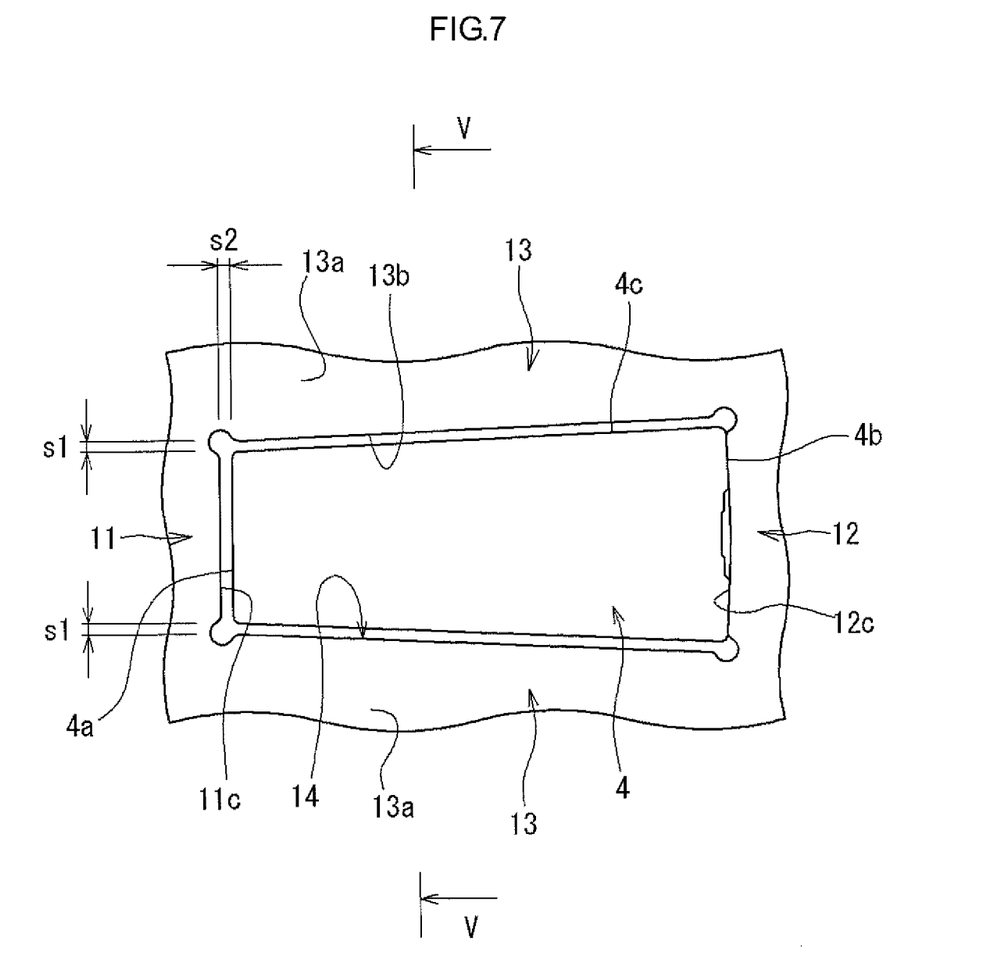
FIG. 7 is a diagram showing appearance of a pocket of the cage as viewed from the outside in the radial direction.

FIG. 7 is a diagram showing appearance of the pocket 14 of the cage 10 as viewed from the outside in the radial direction.

As shown in the figure, a predetermined clearance s1 is provided in the circumferential direction between the pocket 14 and a rolling surface 4c of the tapered roller 4 (both sides of the rolling surface 4c in the radial direction) accommodated in the pocket 14.

A predetermined clearance s2 is provided in the axial direction between the pocket 14 and either the end face 4a of the tapered roller 4 or the end face 4b of the tapered roller 4.

In the tapered roller bearing 1 of the present embodiment, the cage 10 is positioned in the axial direction by the annular side surfaces 11e, 12c (the first slide-contact surface) of the annular portions 11, 12. Each bar 13 has the outer surface 13a (the second slide-contact surface) that slide-contacts the outer ring raceway surface 3a to position the cage 10 in the radial direction by the outer ring raceway surface 3a. The cage 10 is thus stably positioned in the radial direction by the outer ring raceway surface 3a. Since the cage 10 need not be positioned by the tapered rollers 4, the appropriate clearances s1, s2 can be provided between the pocket 14 and the tapered roller 4 as shown in FIG. 7. The clearances s1, s2 can suppress constant slide contact between the bar 13 and the tapered roller 4, and can thus reduce sliding friction between the bar 13 and the tapered roller 4. The clearances s1, s2 can also suppress the risk of the bar 13 interfering with the tapered roller 4, and can thus reduce running torque of the tapered roller bearing 1. Since the risk of the bar 13 interfering with the tapered roller 4 can be suppressed as described above, the risk of the bar 13 being caught by the tapered roller 4 can be suppressed even if the tapered roller bearing 1 is rotated at a high speed. The tapered roller bearing 1 can therefore be rotated at a higher speed.

As described above, according to the present embodiment, running torque of the tapered roller bearing 1 can be reduced, and the tapered roller bearing 1 can be rotated at a higher speed. The clearances s1, s2 are set so that the risk of the bar 13 interfering with by the tapered roller 4 in the pocket 14 and the risk of the bar 13 being caught by the tapered roller 4 can be suppressed. For example, the clearances s1, s2 are set to about several tenths of millimeters.

Figure 8:
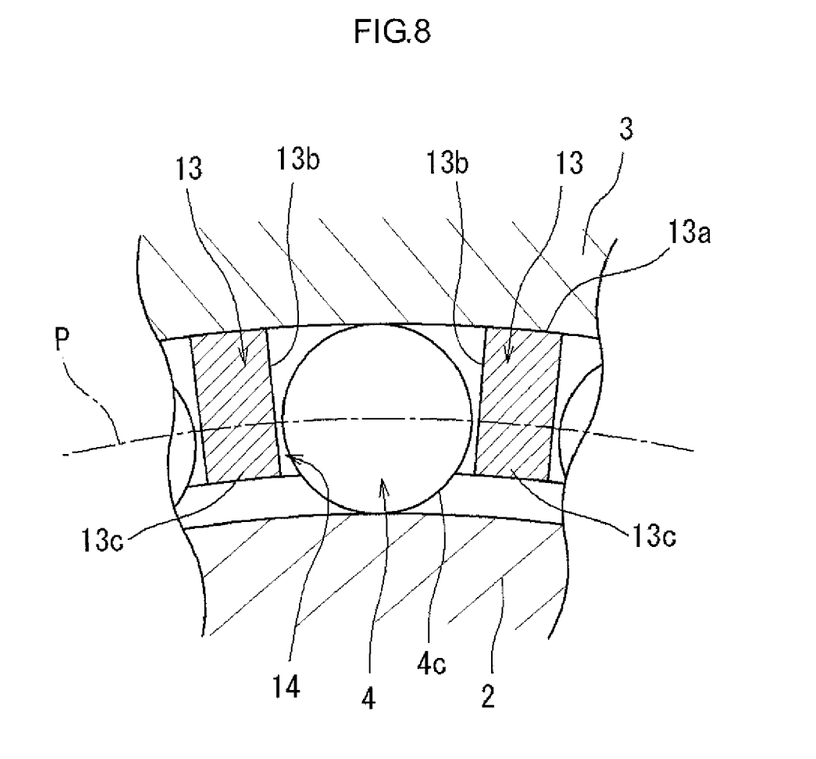
FIG. 8 is a V-V sectional view as viewed from the direction V in FIG. 7.

FIG. 8 is a V-V sectional view as viewed from the direction V in FIG. 7, and shows a radial section of a main part of the cage 10.

In the bars 13 forming the pocket 14, side surfaces 13b facing the pocket 14 are formed so as to extend substantially linearly in the radial direction, as shown in FIG. 8. As described above, the clearances s1, s2 are provided between the pocket 14 and the tapered roller 4, and the side surfaces 13b of the bars 13 are formed so as to extend substantially linearly in the radial direction. Accordingly, adjacent ones of the tapered rollers 4 can be separated from each other by the bar 13, and the contact surface between the side surface 13b of the bar 13 and the rolling surface 4c of the tapered roller 4 can be reduced as much as possible. This can further reduce friction resistance therebetween.

As shown in FIG. 8, a radial inner distal end 13c of each bar 13 is located radially inward of a pitch circle P connecting the axial centers of the tapered rollers 4. In this case, adjacent ones of the tapered rollers 4 can be reliably separated from each other and held by the bars 13 as compared to the case where, e.g., the distal end 13c of each bar 13 is located radially outward of the pitch circle P.

Figure 9:
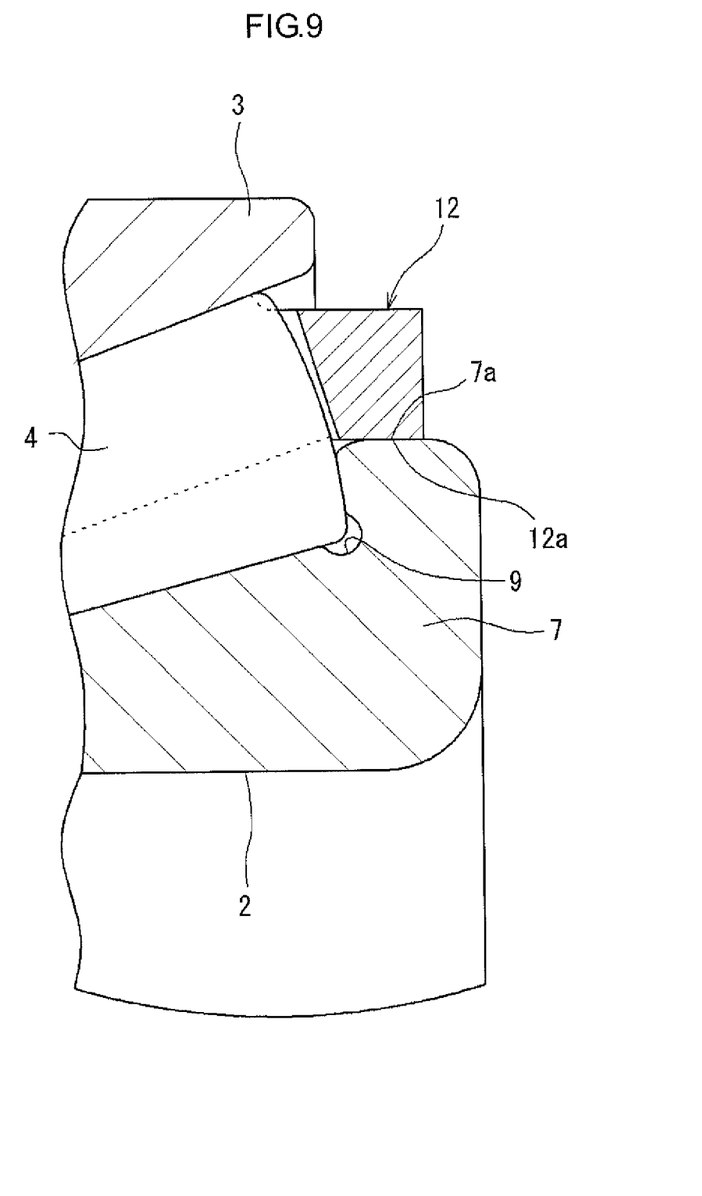
FIG. 9 is a sectional view of a main part, showing a modification of a large diameter annular portion of the cage.

The invention is not limited to the above embodiment. For example, the above embodiment is described with respect to the case where the tapered roller bearing is applied to a differential unit. However, the tapered roller bearing is also applicable to other drive transmission devices such as a transaxle unit. The above embodiment is described with respect to the case where the inner peripheral surface 12a of the large diameter annular portion 12 of the cage 10 is formed as a tapered surface extending along the inner peripheral surfaces of the bars 13. For example, however, as shown in FIG. 9, the inner peripheral surface 12a may be formed as a cylindrical surface that slide-contacts the outer peripheral surface 7a of the large rib 7. In this case, since the inner peripheral surface 12a as a third slide-contact surface slide-contacts the outer peripheral surface 7a of the large rib 7, the cage 10 is positioned in the radial direction by the outer peripheral surface 7a of the large rib 7. Accordingly, the cage 10 can be positioned in the radial direction by both the outer ring raceway surface 3a and the outer peripheral surface 7a of the large rib 7. The cage 10 can thus be more stably positioned.

In the case of FIG. 9, there is substantially no space between the inner peripheral surface 12a of the large diameter annular portion 12 and the outer peripheral surface 7a of the large rib 7. This can further limit discharge of the lubricating oil from the inner ring 2 side of the tapered roller bearing 1. As a result, a larger amount of lubricating oil can be held near the contact portion between the large rib end face 7b of the inner ring 2 and the large end face 4b of each tapered roller 4, as compared to the above embodiment.

The tapered roller bearing of the invention can effectively reduce an edge load that is generated between the large end face of the tapered roller and the large rib end face of the inner ring.

What is claimed is:

1. A tapered roller bearing comprising:
   an inner ring having an inner ring raceway surface and a large rib that adjoins one side of the inner ring raceway surface in an axial direction;
   an outer ring that is disposed concentrically with the inner ring radially outward of the inner ring and has an outer ring raceway surface facing the inner ring raceway surface;
   a plurality of tapered rollers that are interposed between the inner ring raceway surface and the outer ring raceway surface in a rollable manner; and
   a cage that holds the tapered rollers at predetermined intervals in a circumferential direction, wherein
   a large end face of each of the tapered rollers is formed as a convex surface, and a large rib end face of the inner ring which is slide-contacted by the large end face of the tapered roller is formed as a concave surface,
   a curvature radius Ri of the large rib end face is set to a value larger than a distance R, and a curvature radius Rr of the large end face of the tapered roller is set to a range of 80 to 100% relative to the distance R, where R represents a distance from a cone center of the tapered roller to a predetermined reference point that is separated from the cone center along the inner ring raceway surface, and
   a center of a contact ellipse that is formed by contact between the large end face of the tapered roller and the large rib end face is located on an imaginary straight line passing through a center of curvature of the large end face of the tapered roller and a center of curvature of the large rib end face.

2. A power transmission device comprising:
   a power transmission shaft which partially forms a power transmission path; and
   the tapered roller bearing according to claim 1 which rotatably supports the power transmission shaft.

3. The tapered roller bearing according to claim 1, wherein
   the cage includes a small diameter annular portion, a large diameter annular portion that is larger in diameter than the small diameter annular portion, that is separated from the small diameter annular portion at a predetermined interval and that faces the small diameter annular portion, and a plurality of bars that extend between the annular portions and that together with the annular portions define pockets accommodating the respective tapered rollers,
   at least one of the annular portions has a first contact-slide surface that slide-contacts end faces of the respective tapered rollers to position the cage in the axial direction, and
   at least one of the plurality of bars has a second contact-slide surface that slide-contacts the outer ring raceway surface to position the cage in a radial direction by the outer ring raceway surface.

4. A power transmission device comprising:
   a power transmission shaft which partially forms a power transmission path; and
   the tapered roller bearing according to claim 3 which rotatably supports the power transmission shaft.

* * * * *